United States Patent Office 3,367,909
Patented Feb. 6, 1968

3,367,909
POLY-ALPHA-OLEFIN HEAT SEAL
COMPOSITION
Russell G. Hay, Gibsonia, Stanley M. Hazen, Cheswick, and Charles M. Selwitz, Pitcairn, Pa., assignors to Gulf Research & Development Company, Pittsburgh, Pa., a corporation of Delaware
No Drawing. Filed Oct. 24, 1963, Ser. No. 318,525
2 Claims. (Cl. 260—45.95)

This invention relates to new compositions useful as heat sealing adhesives.

Various heat sealing adhesives are known in the art but suffer from certain disadvantages, such as brittleness, thus requiring the need to add a plasticizer to provide flexibility. These disadvantages are overcome by the polymer compositions of the present invention which are internally plasticized.

In addition, in some commercial operations, the heat seal adhesive is maintained in the molten state in a melt pot for extended periods of time, that is at temperatures exceeding about 100° C. for times exceeding about 10 minutes. Such treatment renders unusable many heat seal adhesives in the prior art. The heat seal adhesives of the subject invention also overcome this disadvantage of the prior art heat seal adhesives.

In accordance with the invention, a heat seal adhesive composition comprises a linear alpha-olefin polymer having a number average molecular weight of at least 35,000, substantially each carbon atom in the linear polymer chain having dependent therefrom an alkyl radical having an average number of carbon atoms between 12 and 18, and between 0.01 and 10 weight percent of an antioxidant.

Polymers prepared from various low molecular weight alpha-olefins using a number of different catalyst systems are well known in the art. Polyethylene and polypropylene are perhaps the best known and have achieved the widest commercial success because of the uses to which these polymers can be employed, such as in the preparation of articles of manufacture including plastic toys, packaging containers, etc. Uses for the polymers prepared from the higher molecular weight alpha-olefins, such as those having six carbon atoms per molecule or more, have been under investigation. It has been found that linear polymers prepared from a certain restricted range of alpha-olefins having between 14 and 20 carbon atoms per molecule possess heat seal properties, but only when blended with between 0.01 and 10 weight percent of an antioxidant.

The selected polymers which are utilized to form the compositions of this invention have the general formula:

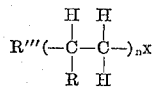

where R is an alkyl radical having an average number of carbon atoms between 12 and 18; R''' is the same as R''' defined hereinafter for the organo-aluminum catalyst component; $n$ is a large integer such that, when taken in conjunction with the average chain length of the alkyl radical, the number average molecular weight of the olefin polymer is at least 35,000; and $x$ is selected from the group consisting of hydrogen;

where R is as defined above; and possibly trace amounts of a metal selected from the group consisting of the metal polymerization catalyst components as defined hereinafter. When R in the above formula is an alkyl radical having 18 carbon atoms, for example, and when the polymer has a number average molecular weight of 35,000, $n$ would have have a value of about 120. The value of $n$ can, therefore, vary between about 120 and about 10,000, or higher, with preferred values depending upon the preferred olefin charge stock and the preferred molecular weight of the polymers.

The selected polymers which are utilized to form the compositions of this invention have a number average molecular weight of at least about 35,000 which corresponds to a weight average molecular weight of at least 100,000. The number and weight average molecular weights are defined, for example, on pages 273 and 292, respectively, of "Principles of Polymer Chemistry" by P. J. Flory, Cornell University Press—1953. The preferred weight average molecular weight of the selected polymers is between 200,000 and 15,000,000 with more preferred molecular weights between 1,000,000 and 6,000,000. The molecular weights of the selected polymers of this invention were determined by the method of dilute solution viscosity which was correlated with the weight average molecular weight of polymers obtained by the light scattering technique which is described, for example, in the article entitled "Photoelectric Light-Scattering Photometer for Determining High Molecular Weights" by Brice, B. A.; Holwer, M.; and Speiser, R. in "Journal of the Optical Society of America", 1950, volume 40, page 768. The correlation of weight average molecular weight and dilute solution viscosity was found to be represented by the following formula:

Weight average molecular
weight$=4.6\times10^5\times V^{1.98}$ where V is the viscosity of a two weight percent solution of the polymer in heptane at 100° F. Some dilute solution viscosities were obtained at temperatures of 175° F. and 210° F. and related back to viscosities at 100° F. by known methods.

The selected polymers utilized in the compositions of the present invention can be prepared by any suitable process. One satisfactory polymerization process comprises the polymerization of alpha-olefins having an average of from 13 to 20 carbon atoms per molecule by means of a catalyst complex comprising an organo-aluminum compound and a heavy metal compound.

The organo-aluminum compound contains at least one hydrocarbon radical linked through a carbon atom directly to the aluminum. Organo-aluminum compounds that can be employed can be represented by the structural formula:

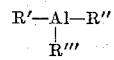

wherein R' is a hydrocarbon radical such as an alkyl, aralkyl, aryl, alkaryl, or cycloalkyl radical having between 1 and 12 carbons atoms per molecule, examples of such radicals being ethyl, propyl, isobutyl, amyl, hexyl, dodecyl, phenylethyl, benzyl, phenyl, tertiarybutylphenyl, and cyclohexyl radicals; R'' is also a hydrocarbon radical as above defined, an OR' radical, hydrogen, or halogen such as chlorine, bromine, iodine, and fluorine; and R''' is hydrogen or a hydrocarbon radical as defined above.

Examples of such organo-aluminum compounds are triisobutylaluminum; diisobutylaluminum hydride; dipropylaluminum chloride; phenylaluminum dihydride; dioctylaluminum bromide; cyclohexyl-bromo-aluminum hydride; ditertiarybutylphenylaluminum hydride; n-pentylisobutylaluminum chloride; dioctylaluminum hydride; and dipropylcyclohexyl aluminum.

The heavy metal compound constituting a component of the catalyst is a compound of a metal occupying the fourth to the sixth positions of the long periods of the Periodic Table in which the elements are arranged in short and long periods and the alkali metals occupy the first position (see Periodic Chart of the Elements on pages 448 and 449 of the 43rd Edition of "Handbook of Chemistry and Physics, 1961–1962," published by Chemical Rubber Publishing Company). These metals are titanium, zirconium, hafnium, vanadium, niobium (columbium), tantalum, chromium, molybdenum, tungsten and metals in the corresponding positions in the last long period in the so-called "actinium series," that is, thorium, protactinium and uranium. The preferred heavy metal compounds are the salts of the heavy metal with monovalent anions. Especially preferred are the halides (chlorides, bromides, iodides and fluorides) and acetyl acetonates of titanium, zirconium and thorium. Titanium halides, especially titanium chlorides, and more especially titanium trichloride, constitute preferred heavy metal compounds. Other heavy metal compounds include other inorganic salts of the metals such as oxyhalides, sulfates, nitrates and sulfides and other organic salts such as acetates and oxalates of the heavy metals.

The alpha-olefins which can be employed to produce the polymers useful as heat sealing adhesives of this invention comprise those alpha-olefins or mixtures of alpha-olefins which have an average of between 14 and 20 carbon atoms per molecule. It is within the concept of this invention, therefore, to employ alpha-olefins which have between 6 and 34 carbon atoms per molecule so long as the average number of carbon atoms per molecule in the charge stock is between 14 and 20. The preferred alpha-olefins are those having between 14 and 20 carbon atoms per molecule and still more preferred are the substantially straight-chain alpha-olefins having between 14 and 18 carbon atoms per molecule. As noted above, mixtures of alpha-olefins can also suitably be employed. In addition, in the event small amounts of internal olefins are present in the charge, a portion of these may enter into the polymerization reaction. The primary criteria for the charge stock for this invention is that the average number of carbon atoms per molecule in the mixture of olefins be between 14 and 20 and preferably between 14 and 18 carbon atoms. For example, a mixture of 50 mol percent of a $C_{24}$ olefin and 50 mol percent of a $C_{10}$ olefin would give a polymer with an average of 17 carbon atoms. As another example, a mixture of 70 mol percent of a $C_{26}$ alpha-olefin and 30 mol percent of hexene-1 would yield a charge mixture having an average of 20 carbon atoms per molecule. Suitable olefins or mixtures of olefins may be obtained, for example, from wax cracking, polymerization, or the more recent telomerization process such as that described in "Annalen die Chemie," 629, 1–256 (1960). Examples of suitable olefins include decene-1; undecene-1; dodecene-1; tridecene-1; tetradecene-1; pentadecene-1; hexadecene-1; heptadecene-1; octadecene-1; nonadecene-1; eicosene-1; heneiscosene-1; docosene-1; tricosene-1; tetracosene-1; pentacosene-1; hexacosene-1; heptacosene-1; octacosene-1; nonacosene-1; triacontene-1; hentriacontene-1; dotriacontene-1; tritriacontene-1; tetratriacontene-1; nonene-3; decene-4; 7-methyldecene-2; 7-methyldecene-1; 6,9-diethylundecene-1; 5,7-dimethyldodecene-1; 4,7,9-trimethyltridecene-1; 5-butyltetradecadiene-1,5; 8-phenylpentadecene-1; 7-cyclohexylhexadecene-1; 11(alpha-cumyl)heptadecene-1; 6-butyloctadecadiene-1,11; 5-(2-norbornyl)nonadecene-1; 6-ethyleicosene-1; 8-t-butyltricosene-1; 7-phenyldocosene-1; 4-methyloctene-1; 4-methylpentadecene-1; 5-methylpentadecene-1; 8-methylpentadecene-1; 9-methylpentadecene-1; 10-phenyldecene-1; 10-cyclohexyldecene-1; 10-cyclooctyldecene-1; 4,5,6,7-tetramethyloctene-1; 4,6,7-trimethyldecene-1; 4,6,7-trimethyldodecene-1.

The catalyst comprising the organo-aluminum compound and the heavy metal compound should be employed in a concentration such that the organo-aluminum compound is present in a concentration of at least 0.1 millimole per liter of alpha-olefin. The preferred concentration of the organo-aluminum compound is between about 1.5 to 100 millimoles per liter of alpha-olefin.

Although a reaction solvent is not necessary, it is preferred that a reaction solvent be employed. A reaction solvent may be any non-polymerizing inert liquid. Examples of suitable inert reaction solvents include saturated hydrocarbons, such as heptane or cyclohexane, as well as liquid aromatic hydrocarbons, such as benzene. The reaction solvent should preferably have from about 4 to 10 carbon atoms per molecule and should be used in an amount from about 1.0 to about 50 volumes for each volume of the olefin monomer.

Any polymerization pressure can be employed. Thus, pressures from atmospheric or below to 1,000 p.s.i.g., or higher, can be employed. Atmospheric pressure is, of course, preferred. Any polymerization temperature can be employed as long as the reactants are maintained in the liquid phase and neither the catalyst, solvent nor olefin are thermally decomposed. Thus, the lower limit for the reaction temperature is determined by the freezing point of the reactants while the upper temperature is limited by the vaporization temperature of the reactants under the reaction pressure employed or the thermal decomposition point of the catalyst or reactants. In general, reaction temperatures between -40° C. and 120° C. are preferred with still more preferred temperatures being between 25° C. and 80° C.

The reaction time should be sufficient to yield a satisfactory conversion of olefin to polymer. The reaction time can be between 0.1 and 48 hours with preferred reaction times between 1 and 10 hours.

The reaction product from the polymerization process comprises polymer, catalyst, and reaction solvent, if employed. The polymer in this environment is unsuitable for use as a heat seal adhesive due to the presence of the polymerization catalyst (at least a portion of which is still active), and the reaction solvent which must be removed before the polymer can be used as a heat seal adhesive. If the catalyst is permitted to remain in the reaction product, the product is black in color and degradation of the polymer may occur on exposure of the reaction product to the atmosphere. The catalyst must therefore be inactivated. The inactivation or "killing" of the catalyst is generally achieved by the addition of an active hydrogen compound, e.g. water or an alcohol such as, for example, isopropanol to the reaction product. The addition of the alcohol or water also serves to quench the reaction product, dissolve the catalyst, and coagulate the polymer into a solid. The polymer is thereafter separated by any suitable means, such as centrifugation, from the alcohol catalyst and reaction solvent, if any, and further treated to remove residual amounts of catalyst. For example, the polymer can be further washed or treated with dilute hydrochloric acid to convert the catalyst into soluble chlorides. If the acid treatment is used, the polymer would then be neutralized with dilute caustic and washed with further amounts of an alcohol, such as isopropanol.

The selected polymers defined above which are to be utilized in the compositions of this invention are, as noted above, not suitable as heat sealing adhesives, per se, when the heat seal adhesive is maintained for extended periods of time in the molten state. Normally, the compositions of this invention are melted in a melt pot and the materials to be bonded are coated with a thin layer of the melted compositions of this invention over as large an area as desired by any suitable means, such as by flowing or roll coating. A seal is effected by heating the coated materials to a temperature between 100° C. and 200° C. for a time between 0.01 and 10 minutes while applying sufficient pressure to cause a joining of the materials. This pressure is normally between 0.01 and 1000 pounds per square inch with preferred pressures between 0.1 and 10 pounds per square inch.

There are a large number of antioxidants well known in the art which can be successfully employed in the compositions of the subject invention. Suitable antioxidants can be those selected from the group consisting of phenols, amino-aromatics and organic sulfides. It is preferred that the antioxidant be soluble in the selected polyalpha-olefins and for this reason the alkylated phenols, alkylated bis-phenols and the higher molecular weight amino-aromatics and organic sulfides, such as those having between 12 and 50 carbon atoms per molecule are preferred. Examples of antioxidants of the phenol type include hydroquinone; resorcinol; catechol; and pyrogallol. More suitable phenolic compounds are the oil soluble phenolic compounds such as those described in the U. S. Patent 3,041,279. These compounds include the amino-phenols or hydroxyamines such as N-n-hexyl-paraamino phenol and 3,5-dialkyl-4-hydroxy-benzylamines. The bis-phenols are also included, such as bis-phenol A; and 1,1 - bis(3-tert-butyl-5-methyl-2-hydroxyphenyl) methane. Suitable specific examples of the amino-aromatic type compounds include paraphenylene diamine; N-butyl-paraphenylene diamine; p,p' - diamine diphenyl; 2-hexadecyl-1,4-diaminobenzene; di-N-lauroyl-para-phenylenediamine. Especially preferred antioxidants are the organic sulfide type and, in particular, the organic disulfides. Suitable specific examples of suitable organic sulfides include N-n-decyl thiourea; di-t-amyl-dihydroxy diphenyl disulfide (and others listed in the U.S. 2,209,463) and di-lauryl-B,B'-dithiodipropionate.

The amount of the antioxidant to be employed can vary between about 0.01 and 10 percent by weight of the olefin polymer with preferred concentrations between 0.5 and 1 percent by weight. The amount of antioxidant will depend upon the particular type of antioxidant and the temperatures to which the compositions will be subjected. In general, the higher molecular weight polymers require the higher amounts of antioxidant since the viscosities of the molten polymers are higher and increased temperatures are required to reduce the viscosity and thus effectuate a seal.

The alpha-olefin polymers used in the compositions of this invention to be described in the examples below were prepared by the following procedure. To 500 cc. of cyclohexane, which had been dried over molecular sieves, was added 100 cc. of the desired alpha-olefin or mixture of alpha-olefins. To the admixture of cyclohexane and alpha-olefins defined above was added 0.62 gram of $TiCl_3$ (6.70 millimoles per liter of monomer plus cyclohexane) and 0.27 cc. of triethylaluminum (3.32 millimoles per liter of monomer plus cyclohexane). The admixture was held at the autogenous pressure of the reaction and at a temperature of 60° C. for 24 hours with constant agitation to insure thorough mixing. The admixture was then quenched with about 100 cc. of isopropyl alcohol and then poured into an additional 500 cc. of isopropyl alcohol with constant stirring. As the product thickened, it was stirred in the alcohol to wash out the cyclohexane and catalyst. The liquid was decanted and the product was again washed with 500 cc. of isopropyl alcohol, followed by two 500 cc. washes with methyl alcohol.

Example 1

A substantially pure $C_{14}$ alpha-olefin was polymerized as described above to yield a tetradecene-1 polymer having a melting point of 57° C.; a density at 25° C. of 0.848 and a dilute solution viscosity of 2.45 (hence a weight average molecular weight of 2.8 million). To a four gram sample of this polymer in the molten state at 130° C. was added 0.02 gram of bisphenol A [2,2-bis(p-hydroxyphenyl)propane]. After 12 hours, while maintaining the polymer-antioxidant composition molten at 130° C., the composition was tested as a hot melt adhesive by spreading about 0.25 gram of the molten composition between two pieces of 2 by 2 inch bond paper and heating the paper-polymer-paper sandwiches to a temperature of 130° C. under a 200 gram weight (a pressure of 0.35 p.s.i.g.) for 20 minutes.

On cooling, the pieces of bond paper would not separate without tearing.

Example 2

Example 1 was repeated except no antioxidant was employed. The bond paper was found not to adhere for the two pieces of paper pulled apart readily at a sticky interface.

A comparison of Example 2 with Example 1 shows the necessity for employing an antioxidant.

Example 3

Example 1 was repeated except the alpha-olefin was dodecene-1. The dodecene-1 polymer had a melting point of 45° C., a density at 25° C. of 0.839 and a dilute solution viscosity of 0.74 (a weight average molecular weight of 250,000). Proper adhesion was not achieved for the bond paper pulled apart at a sticky interface.

A comparison of Example 3 with Example 1 shows the criticality of the number of carbon atoms in the alpha-olefin monomer.

Example 4

Example 1 was repeated except the olefin was a mixture of olefins having 20 to 28 carbon atoms per molecule (the average monomer size was 23 carbon atoms per molecule). The polymer had a weight average molecular weight of over 1,000,000. Proper adhesion was not achieved for the bond paper pulled apart.

Example 4 shows again the criticality of carbon atoms in the monomer.

Polyoctadecene-1 (weight average molecular weight of about 7 million) was also found to be a suitable heat melt adhesive.

In addition, the compositions of this invention can contain other substances known in the art to improve their bonding characteristics such as polyvinyl acetate and its derivatives, and the polyamides to aid in bonding cellulosic materials.

Resort may be had to such variations and modifications as fall within the spirit of the invention and the scope of the appended claims.

We claim:
1. A heat seal adhesive composition consisting of a solid linear alpha-olefin polymer having a number average molecular weight of at least 35,000, substantially each alternate carbon atom in the linear polymer chain having dependent therefrom an alkyl radical being between 12 and 18, and between 0.01 and 10 weight percent of 2,2-bis(p-hydroxyphenyl) propane.

2. A heat seal adhesive composition consisting of a solid linear polymer of tetradecene-1 which has a weight average molecular weight between 200,000 and 8,000,000, substantially each alternate carbon atom in the linear polymer chain having dependent therefrom a saturated straight chain radical having 12 carbon atoms, and between 0.01 and 10 weight percent of 2,2-bis(p-hydroxyphenyl) propane.

References Cited

UNITED STATES PATENTS

| | | | |
|---|---|---|---|
| 3,000,857 | 9/1961 | Craven | 260—45.95 |
| 3,113,167 | 12/1963 | Sauer | 260—94.9 |
| 3,124,555 | 3/1964 | Bown | 260—45.95 |
| 3,147,230 | 9/1964 | Gladding | 260—45.95 |
| 3,216,967 | 11/1965 | Hawkins | 260—45.95 |

DONALD E. CZAJA, *Primary Examiner.*

LEON J. BERCOVITZ, *Examiner.*

H. E. TAYLOR, JR., *Assistant Examiner.*